Aug. 18, 1936.   T. STIEBEL   2,051,657

ELECTRICALLY HEATED WATER RESERVOIR

Filed Jan. 9, 1936   2 Sheets-Sheet 1

INVENTOR
T. Stiebel
By his Attorney John O. Seifert

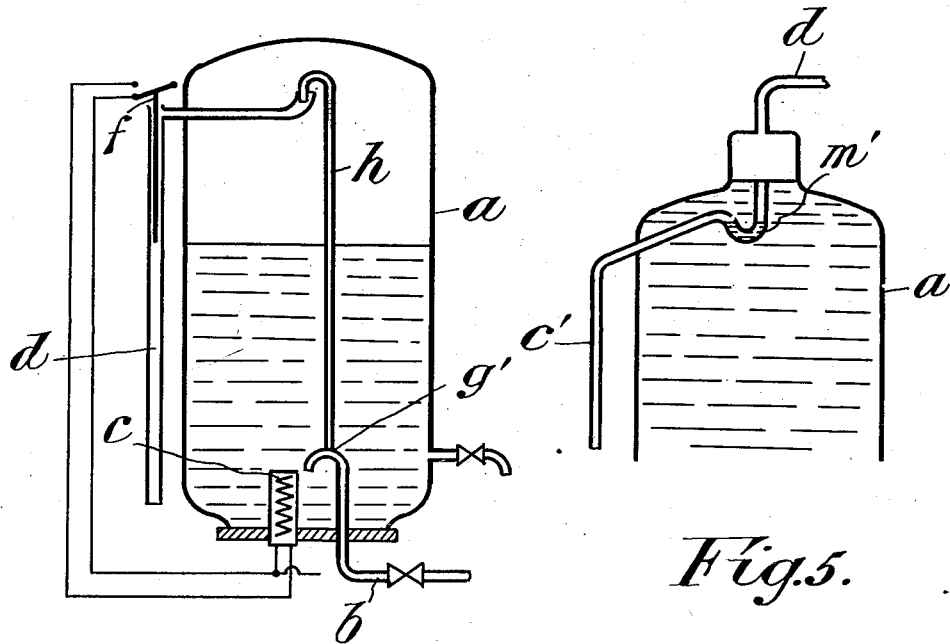
Fig.3.
Fig.5.
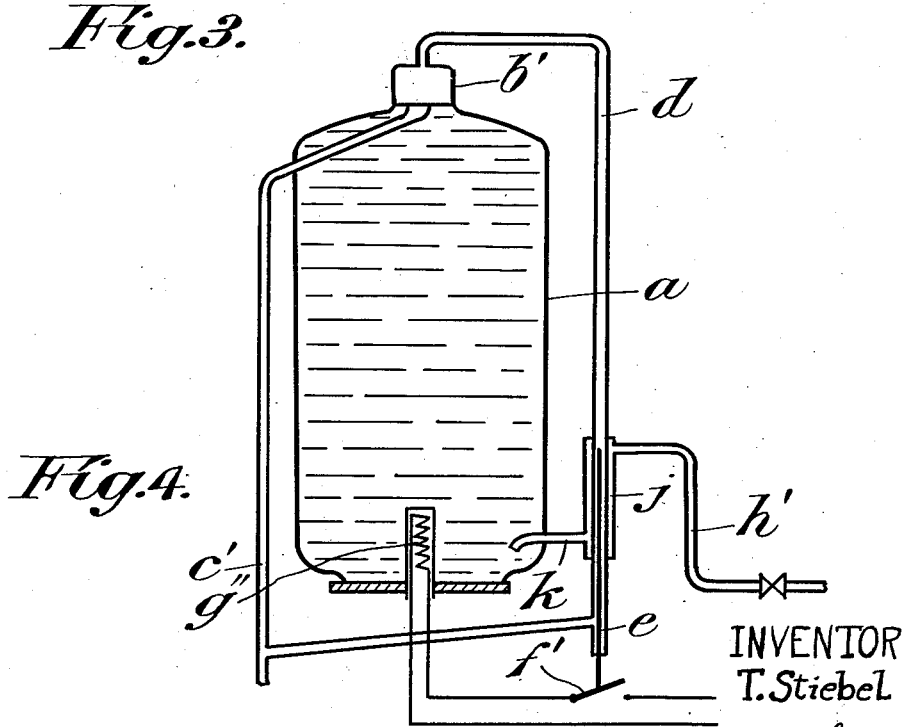
Fig.4.

Patented Aug. 18, 1936

2,051,657

UNITED STATES PATENT OFFICE 2,051,657

ELECTRICALLY HEATED WATER RESERVOIR

Theodor Stiebel, Berlin-Tempelhof, Germany

Application January 9, 1936, Serial No. 58,242
In Germany November 13, 1934

9 Claims. (Cl. 219—38)

This invention relates to electrically heated water reservoirs.

It is already known in electrically heated water tanks or reservoirs to provide devices for the automatic adjustment of temperature, and by means of which the temperature of the water is kept slightly below boiling point and the variations of the boiling point, caused by alterations of the air pressure, are compensated. Whilst the simple appliances require waiting and attention, the actual tanks or reservoirs often operate unsatisfactorily owing to their extremely sensitive and complicated temperature regulating apparatus, and in addition they are costly to manufacture.

The object of the present invention is to provide an electrically heated reservoir in the form of a low pressure reservoir in which an accurate, effective, and simple method of operation is ensured by means of a certain arrangements of a simple coarse adjustment thermostat or temperature sensitive member, overflow pipe and cold water supply.

The invention consists of an electrically heated reservoir in which the content is maintained at a substantially constant temperature by virtue of a coarse adjustment thermostat located in the overflow pipe of the reservoir, the arrangement being such that said thermostat switches off the heating current when steam is formed and switches the heating current on again when the temperature falls to a slight extent (1° to 2°) either owing to cold water entering the reservoir or through heat dissipation.

When the water in the reservoir is heated the temperature increases up to boiling point, whereupon steam begins to form. The thermostat, which is adjusted to switch off the heating current at a point below boiling point for instance at 90°, is influenced by the steam flowing out through the overflow pipe.

If the content of the reservoir be heated up to boiling point, the thermostat will switch off the heating current as a result of the steam flowing through the overflow pipe, and the content of the reservoir will then gradually cool. The thermostat however, will cool somewhat more rapidly. Since the thermostat is so adjusted that its switching temperature lies beneath boiling point, at 90° for example, suitable adjustment of the thermostat will ensure that the switching on of the heating current is effected when the content of the reservoir has cooled about 1° to 2° or more as may be desired. In this manner accurate regulation of the temperature at boiling point can be ensured with the aid of a simple coarse adjustment thermostat.

Since the thermostat for constructional purposes must often be fixed at a point in the overflow pipe which lies within the heat insulation of the reservoir, it is advisable to increase the cooling affecting the thermostat. This can be effected by providing, above the surface of the water, a space sufficiently large for the reception of a certain quantity of steam. After the switching off of the heat supply the steam existing above the surface of the water will then gradually condense, whereby a reduction of volume will occur. In consequence of this air, which is cool in comparison to the water, enters through the overflow pipe and thus the temperature of the thermostat falls much more rapidly than would otherwise be the case. The action of the cooling stream of air is naturally the greater the more the air passes through the pipe i. e. the greater the volume of steam which it is able to condense in a given time.

To ensure perfect operation of the reservoir it is necessary for the heating current to be switched on immediately hot water is drawn off, since cold water then flows into the reservoir.

The solutions of these problems will be described hereinafter separately for reservoirs of the kind in which water is drawn off by a tap or cock arranged at the lower end of the reservoir, hereinafter referred to as discharge reservoirs; and for reservoirs in which hot water is drawn off on the overflow principle, that is hot water is forced through an overflow pipe by cold water flowing into the reservoir, such reservoirs being hereinafter referred to as overflow reservoirs.

In the case of a discharge reservoir a second coarse adjustment thermostat can be employed which is incorporated in the reservoir, and which is arranged in the flow of the incoming cold water when the reservoir is filled. The switching devices of the two thermostats must then be electrically co-ordinated accordingly.

In order that the invention may be more clearly understood reference will now be made to the accompanying drawings in which various modifications are illustrated in longitudinal section by way of example.

Figs. 2 and 3 are modifications of Fig. 1.

Figs. 4 and 5 are longitudinal sections of the forced circulation type.

Figure 1:
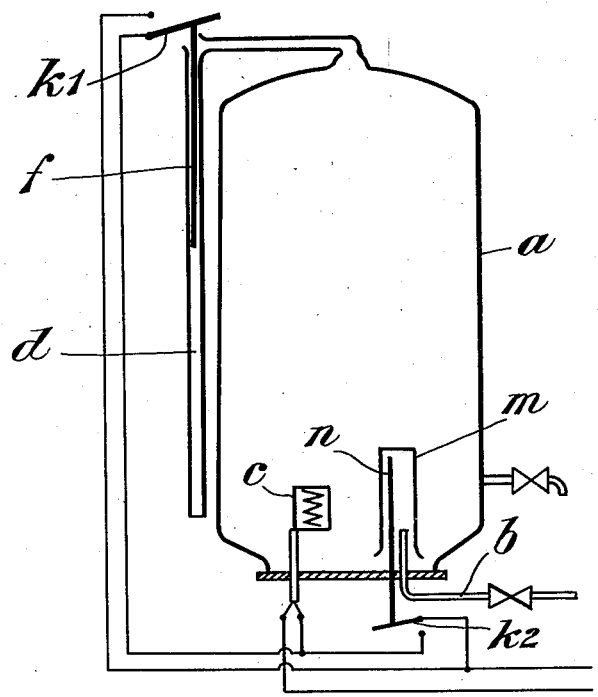
Fig. 1 is a longitudinal section of the reservoir type of water heater.

In Figure 1 of these drawings $f$ is a coarse adjustment thermostat located in the overflow pipe $d$ of a reservoir $a$ and connected with an electric contact $k1$, and $n$ is also a coarse adjustment thermostat arranged in a casing $m$ within the reservoir, and connected with a contact $k2$. The contacts $k1$ and $k2$ are connected in parallel in the circuit of an electric immersion heater $c$ located within the lower end of the reservoir $a$.

The thermostat $n$ is adjusted to open the contact $k2$ when the water in the reservoir reaches a predetermined temperature (for example between 80° and 90°) and the thermostat $f$ is arranged to open said contact $k1$ immediately the water reaches boiling point, and to close the said contact $k$ when the temperature of the water falls to a slight extent (1° to 2°). Thus after the water has been initially heated the thermostat $f$ operates to maintain the water at a substantially constant predetermined temperature.

The apparatus operates in the following manner: Assuming a volume of hot water to have been drawn off from the reservoir $a$, cold water flows in through a pipe $b$ into the casing $m$ and influences the thermostat $n$ which then closes the contact $k2$ and thereby connects the immersion heater $c$ which heats the cold water which has been introduced into the reservoir. When the water reaches a predetermined temperature the contact $k1$ is closed automatically by the thermostat $f$ which however does not affect the heater as this is already energized. When the entire contents of the reservoir is heated to a predetermined temperature (for example between 80° and 90°) the thermostat $n$ opens the contact $k2$ which again does not affect the immersion heater $c$ since the contact $k1$ is now closed. When the water has been heated to such an extent that steam forms however the steam flowing through the overflow pipe $d$ influences the thermostat $f$ which then opens the contact $k1$ and thus immediately cuts off the electric current from the heater $c$. The two contacts $k1$ and $k2$ are therefore operated alternately in such a manner that when cold water is introduced the electric current is switched on by the action of the thermostat $n$ influenced by incoming cold water and the current is subsequently switched off by the action of the thermostat $f$ when the water reaches such a temperature that steam is formed.

By virtue of its arrangement, in the overflow pipe the thermostat $f$ is immediately effected by any change in temperature occurring in the reservoir, for instance when the temperature of the water reaches boiling point steam immediately passes through the overflow pipe and consequently influences the thermostat which then opens the contact $k1$ as stated above, thus the current is switched off so that the water then commences to cool whereupon condensation occurs in the reservoir which causes cold air to be drawn in through the overflow pipe past the thermostat $f$ which then again closes the contact $k1$. Thus it will be seen that the thermostat $f$ operates to maintain the water at a substantially constant temperature.

In a modification the cold water pipe is extended above the surface of the water the arrangement being such that the cold water introduced into the reservoir splashes into the steam space whereby an immediate condensation of the steam above the surface of the water is effected, which results in a strong intake of external air and thereby the closing of the electric current by means of the thermostat. In order to ensure satisfactory operation of this arrangement even when the reservoir is full, the upper end of the cold water pipe must be located above the upper edge of the overflow pipe.

It is also possible to arrange the overflow pipe in such a manner that a small proportion of the incoming cold water, which is splashed into the steam space, runs away through the overflow pipe and thereby cools the thermostat, or a cold water pipe introduced in known manner into the lower part of the reservoir may be provided with a branch pipe leading to the overflow pipe, whereby a small proportion of the cold water introduced runs off through the overflow pipe and acts upon the thermostat.

Figure 2:
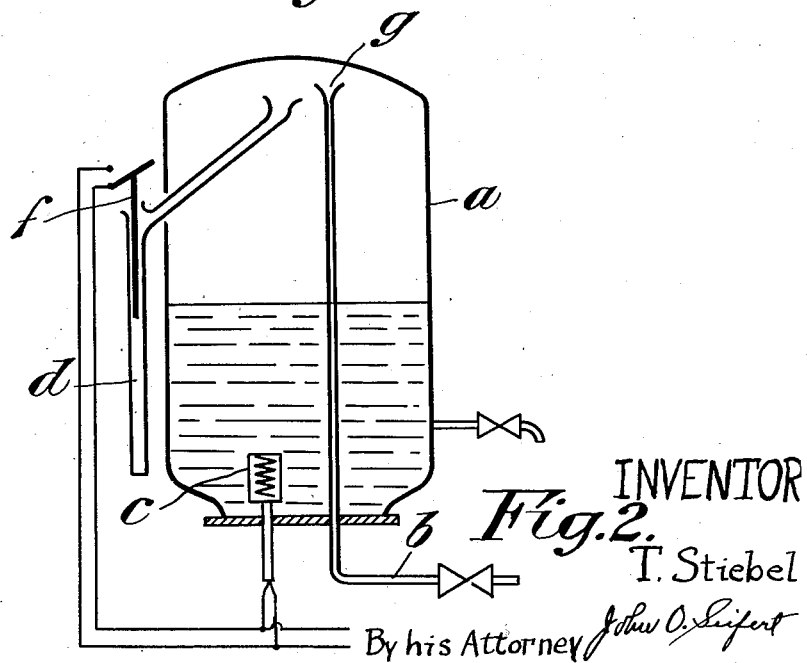

One of the above modifications is illustrated in Figure 2, wherein the cold water is supplied to the reservoir through a pipe $b$ which is provided with a rose head $g$ situated above the upper edge of the overflow pipe $d$. The cold water introduced is therefore splashed into the steam space in a finely divided state, whereby a rapid condensation and diminution of volume occurs and the thermostat $f$ arranged in the pipe $d$ is influenced by the cold air streaming in. In addition a part of the spray from the overflow pipe $d$ is caught and led over the thermostat $f$, whereby the two actions augment one another.

In Figure 3 the cold water is supplied through the pipe $b$ into the lower part of the reservoir. From $g'$ a branch pipe $h$, of substantially small cross-section, leads to the inlet of the overflow pipe $d$, and conveys some of the inflowing cold water to the overflow pipe $d$ and then to the thermostat $f$.

The arrangements described above are not suitable for reservoirs in which water is drawn off by means of the overflow principle, owing to the fact that, in such reservoirs, water constantly flows off through the overflow pipe when heated owing to expansion, for example if the water is heated up to about 90°, expansion will cause it to flow through the overflow pipe at that temperature and act upon the thermostat and thus cause the electric heating current to be cut off. Similarly whenever water is drawn off the hot or boiling water flowing through the overflow pipe would flow over the thermostat and cause the heating current to be switched off, whereas the current is required to be switched on whenever water is drawn off.

In order to enable the arrangement according to the present invention to be applied successfully to reservoirs in which water is drawn off by the overflow principle two overflow pipes are employed one for accommodating the thermostat and the other for drawing off water, the inlet of the former being located higher in the reservoir than that of the latter, so that when cold water is introduced into the reservoir the hot water will flow away through the ordinary overflow pipe and not through the pipe which accommodates the thermostat which will thus not be affected. The overflow pipe accommodating the thermostat may open into the ordinary overflow pipe below the reservoir, or it may have its own outlet.

When the reservoir is in use the steam resulting when the water boils will stream out through both overflow pipes, and will then cause the thermostat, which is adjusted, to switch off the heating current when the temperature of the water reaches, for example, 90°. If, however, water is drawn off, abstraction of water takes place only through the ordinary overflow pipe, and never through that in which the thermostat is arranged. With this arrangement the thermostat is not influenced either by hot water seeping out owing to expansion, or by the water flowing away through the overflow pipe when water is drawn off.

In order to ensure that the heating current is switched on whenever water is drawn off through the overflow pipe a jacket is arranged around that part of the overflow pipe in which the thermostat is located, the cold water flowing into the reservoir passing through this jacket. With this arrangement the thermostat after having switched off the heating current under the influence of the steam flowing past it, is rapidly cooled by the inflowing cold water which flows through the jacket surrounding it when water is drawn off from the reservoir, and thus operates to again switch on the heating current. The content of the reservoir is then heated again by the heater and the steam resulting flows through the overflow pipe and again influences the thermostat. At the same time however the cold water in the jacket is heated by the steam flowing through the overflow pipe to such an extent that an appreciable influencing of the thermostat by the water jacket no longer takes place, and said thermostat again operates to switch off the current.

Instead of the special jacketing of part of the overflow pipe it is of course possible to coil a part of the cold water inlet pipe around the appropriate part of the overflow pipe.

It will be understood that in the arrangements described above only a part of the steam produced will stream past the thermostat as some of the steam will pass through the ordinary overflow pipe. This however is not a disadvantage of any consequence since experience has proved that only a small quantity of steam is required to influence the thermosat satisfactorily. However, simple means may be provided if desired, for preventing steam from passing through the ordinary overflow pipe, for example by providing a substantially U-shaped bend in the overflow pipe preferably inside the reservoir, said U-bend being so arranged as to be always full of water, so that the steam cannot flow out through this pipe, providing there is not excess pressure in the reservoir.

Examples of the arrangements described above are illustrated in Figures 4 and 5 in which $a$ is the reservoir, the upper cap $b'$ of which is of dome-like form. The overflow pipe $c'$ by means of which the boiling water is drawn off, runs into the interior of the reservoir. The steam flows through the pipe $d$ past thermostat $e$ which controls the contact $f'$ to open and close the circuit for the heater $g'$. In the example illustrated in Figure 4 the pipe $d$ opens into the overflow pipe $c'$ behind the thermostat. The incoming cold water flows through the pipe $h'$, through the jacketing $j$ and the pipe $k$ into the lower part of the reservoir. In Figure 5 the overflow pipe $c'$ in the inside of the reservoir is provided with a U-shaped bend $m'$ so that even after water has been drawn off the part $m'$ always remains full of water and therefore acts as automatic trap aagainst the passage of steam.

What I claim and desire to secure by Letters Patent is:—

1. In a water heater, a water reservoir having a water supply inlet and an overflow outlet adapted for the passage of steam generated in the reservoir and passage of air into the reservoir induced by the condensation of the steam and the supply of water to the reservoir, an electric heating unit mounted in the reservoir, an electric switch mechanism connected in the circuit of the electric heating unit, and a thermostat device mounted in the overflow outlet connected to and operative to actuate the switch mechanism to open the circuit of the electric heating unit by steam passing through the overflow outlet and close the circuit of the heating unit by air passing through the overflow outlet.

2. In a water heater, a water reservoir having a water supply inlet at one end and an overflow outlet at the opposite end adapted for the passage of steam generated in the reservoir and passage of air into the reservoir induced by the condensation of the steam in the reservoir, an electric heating unit mounted in the reservoir, a pair of electric switch mechanisms connected in the circuit of the electric heating unit, a thermostat device mounted in the reservoir adjacent the water supply inlet connected to and operative to actuate one of the switch mechanisms to close the circuit of the electric heating unit by the flow of water into the reservoir through the inlet thereof and open said circuit by a predetermined temperature of the water in the reservoir, and a second thermostat device mounted in the overflow outlet connected to and operative to actuate the other switch mechanism to open the circuit of the electric heating unit by the passage of steam through the overflow outlet and close the circuit by air passing through the overflow outlet.

3. In a water heater, a water reservoir adapted to have an air space above the water therein and arranged with an overflow outlet in communication with said air space, a water supply inlet for the reservoir arranged to convey a portion of the water supplied to the reservoir to the overflow outlet, an electric heating unit mounted in the water in the reservoir, an electric switch mechanism connected in the circuit of the electric heating unit, and a thermostat device mounted in the overflow outlet connected to and operative to actuate the switch mechanism to open the circuit of the electric heating unit by heated air from the air space and close said circuit by the water from the water supply inlet.

4. In a water heater, a water reservoir adapted to have an air space above the water therein and arranged with an overflow outlet in communication with said air space, a water supply pipe terminating in the air space and arranged to spray the water in said space, an electric heating unit mounted in the water in the reservoir, an electric switch mechanism connected in the circuit of the electric heating unit, and a thermostat device mounted in the overflow pipe connected to and operative to actuate the switch mechanism to open the circuit of the electric heating unit by heated air from the air space and close said circuit by air cooled by the water sprayed from the water supply pipe.

5. A water heater as claimed in claim 4, wherein the water supply pipe terminates in a plane above the inlet to the overflow outlet.

6. In a water heater, a water reservoir adapted to have an air space above the water therein and arranged with an overflow outlet in communication with said air space, a water supply pipe having the main outlet terminating in the water in the reservoir and an extension terminating in the air space in communication with the overflow outlet, an electric heating unit mounted in the reservoir adjacent the main outlet of the water supply pipe, an electric switch mechanism connected in the circuit of the electric heating unit, and a thermostat device mounted in the overflow outlet connected to and operative to actuate the switch mechanism to open the circuit of the electric heating unit by heated air from the air space passing through the overflow outlet and close said circuit by water passing through the overflow outlet from the extension of the water supply pipe.

7. In a water heater, a water reservoir having an overflow outlet at the top thereof for the passage of steam generated in the reservoir, a water supply pipe having the outlet thereof terminating in the lower portion of the reservoir and arranged to circulate water about the overflow outlet, an electric heating unit mounted in the lower portion of the reservoir, an electric switch mechanism connected in the circuit of the electric heating unit, and a thermostat device mounted in the overflow outlet connected to and operative to actuate the switch mechanism to open the circuit of the electric heating unit by the steam passing through the overflow outlet and close said circuit by water flowing about the overflow outlet.

8. In a water heater, a water reservoir, a discharge pipe leading from the upper portion of the reservoir and adapted to maintain an air space in the upper portion of the reservoir, a second pipe leading from and in communication with the air space in the reservoir for the passage of steam from said air space and passage of air caused by the condensation of the steam in the air space, a water supply pipe terminating in the reservoir, an electric heating unit mounted in the water in the reservoir, an electric switch mechanism connected in the circuit of the electric heating unit, and a thermostat device mounted in the second pipe connected to and operative to actuate the switch mechanism to open the circuit of the electric heating unit by the steam passing through the second pipe and close said circuit by the air passing through said second pipe.

9. A water heater as claimed in claim 8, wherein the first pipe is arranged with a bend to form a water trap and prevent the passage of steam through said pipe.

THEODOR STIEBEL.